No. 736,496. Patented August 18, 1903.

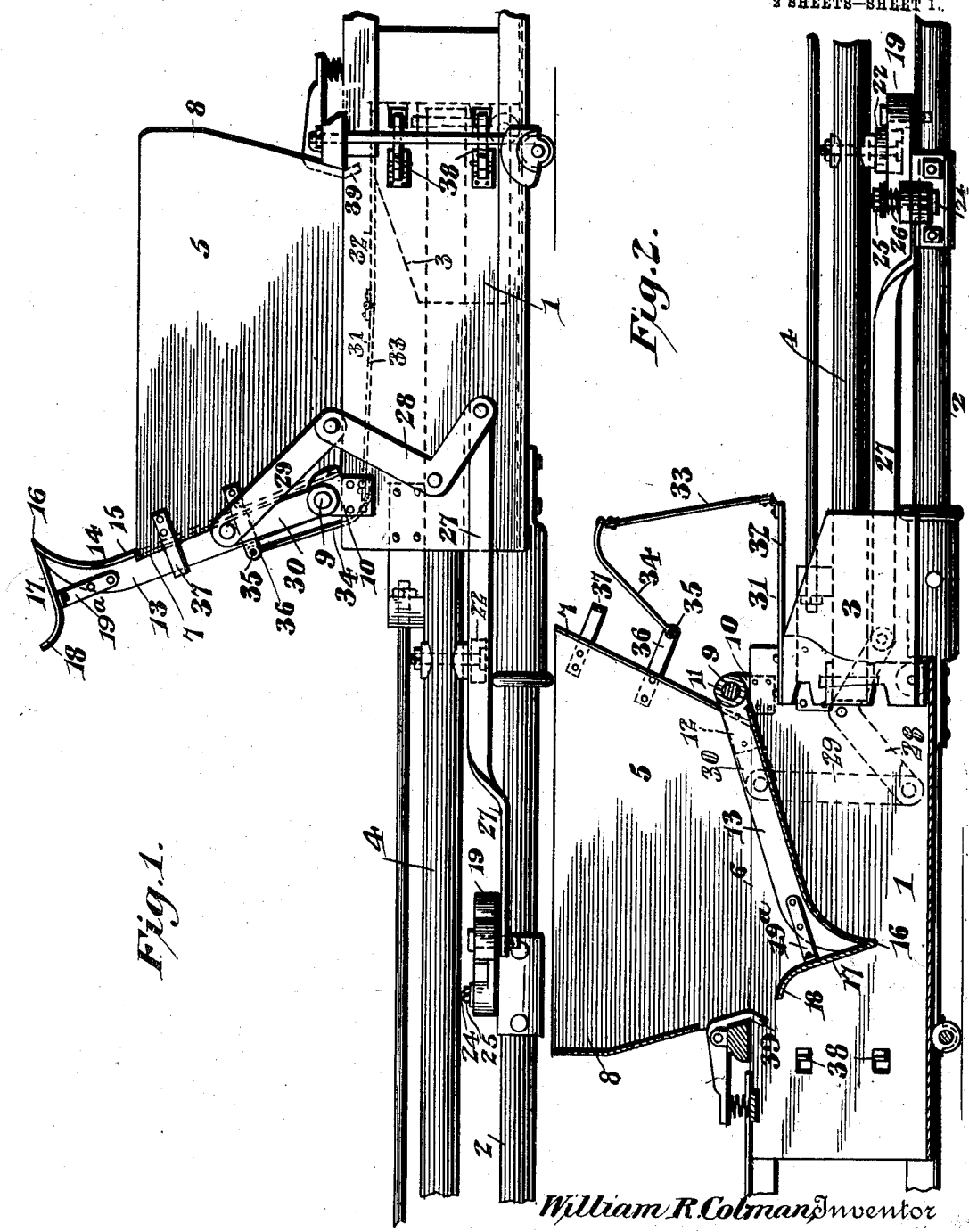

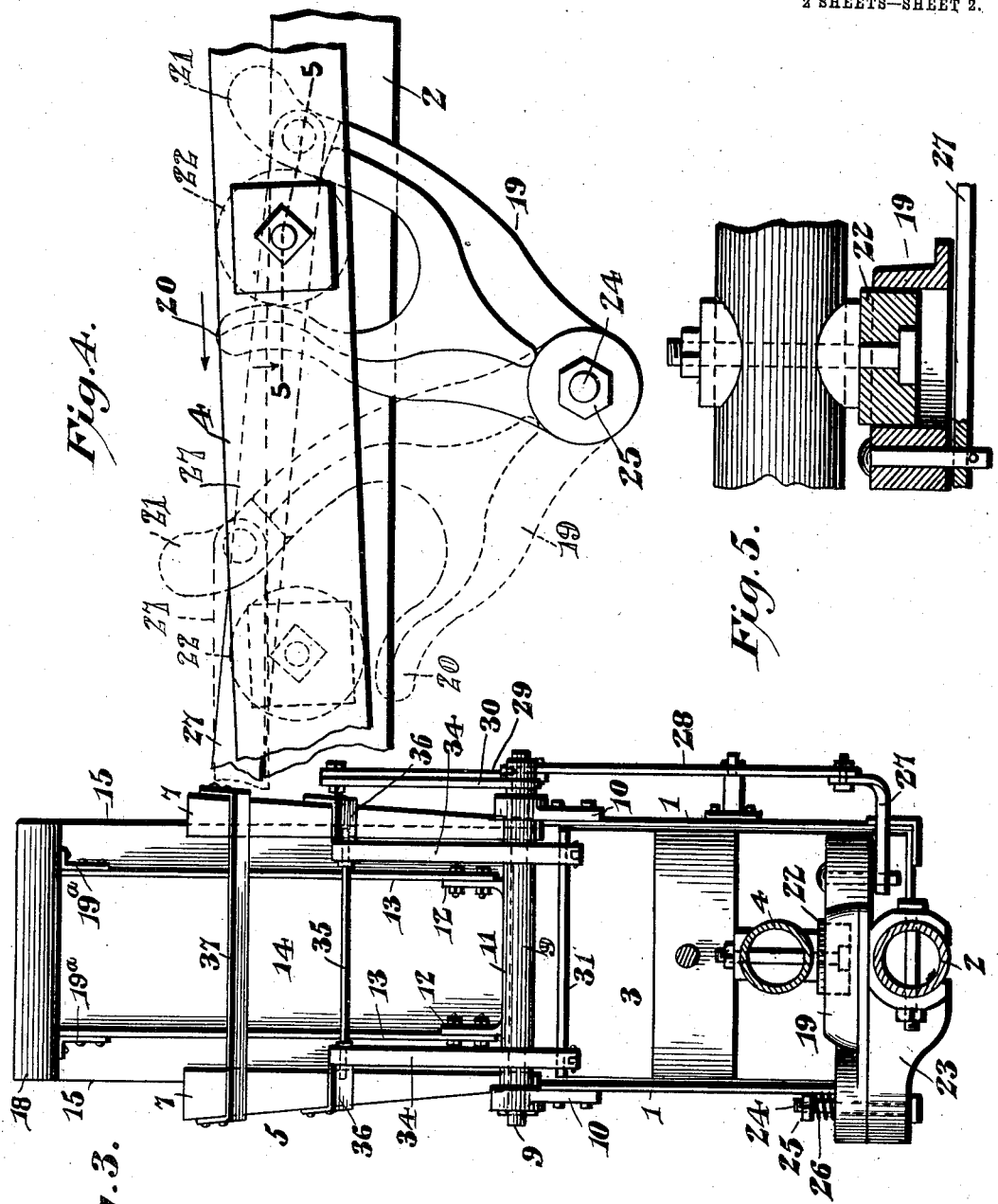

UNITED STATES PATENT OFFICE.

WILLIAM RICHARD COLMAN, OF QUINCY, ILLINOIS.

BALING-PRESS.

SPECIFICATION forming part of Letters Patent No. 736,496, dated August 18, 1903.

Application filed August 16, 1902. Serial No. 119,951. (No model.)

*To all whom it may concern:*

Be it known that I, WILLIAM RICHARD COLMAN, a citizen of the United States, residing at Quincy, in the county of Adams and State of Illinois, have invented a new and useful Baling-Press, of which the following is a specification.

This invention relates to baling-presses, and more particularly to what is known in the art as a "self-feeder" therefor.

The object of the invention is to produce a simple, effective, and positively-operating form of feeding apparatus operated by the pitman of the press during a small portion only of the movement of the pitman in opposite directions in order that the hopper and feed-throat of the press will be open for the reception of hay or other material during the major portion of the plunger-stroke.

To the accomplishment of this object and others subordinate thereto the invention consists in the construction and arrangement of parts to be described, illustrated in the accompanying drawings, and embraced within the scope of the appended claims.

In said drawings, Figure 1 is a side elevation of a baling-press equipped with my self-feeder. Fig. 2 is a longitudinal sectional view, partly in elevation, of the subject-matter of Fig. 1, the parts of the press and feeder being in different positions. Fig. 3 is a front elevation of the press, showing the power-support and the pitman in section. Fig. 4 is a plan view showing the relation of the feed-cam to its operating-roller and the pitman, the cam being shown at one limit of its movement in dotted lines; and Fig. 5 is a sectional elevation on the line 5 5 of Fig. 4 looking in the direction of the arrows.

Like numerals of reference are employed to designate corresponding parts throughout the several views.

1 indicates a press-box, to which is connected the usual tubular reach 2, at the outer end of which is located the power mechanism. (Not illustrated.) Within the press-box is designed to reciprocate a head or plunger 3, operated by the power mechanism through the medium of a pitman 4. The general construction and arrangement of these parts is ordinary and need not be further described.

Above the press-box 1 is located the hopper 5, opening into the press through a feed-throat 6 and having its front end open, except for a pair of stop-flanges 7, which project inwardly from the upwardly-diverging side walls 8. Immediately in advance of the hopper 5 is mounted a shaft 9, journaled in suitable brackets 10, secured to the opposite sides of the box. (See Figs. 2 and 3.) This shaft rotatably supports a sleeve 11, having a pair of lateral lugs 12, to which are attached the arms 13 of what I will term the "feeder" 14. The feeder-arms 13 are formed of bar metal, and to their rear edges is secured a feed-plate 15, extending nearly the full width of the hopper and constituting the front wall thereof when the feeder is raised. The upper edge of the plate 15 is curved to form a beak 16, from which extends at an acute angle a feed-plate extension 17, disposed substantially at right angles to the feed-plate and having its edge 18 curved, as shown. The extension 17 is braced by a pair of braces 19ª, secured to the feeder-arms, and the ends of the latter are curved in correspondence with the curvature of the plate 15 to insure the formation of a feeder of light, but exceedingly rigid construction. The feeder 14 is intended to be swung downwardly to feed the hay or other material into the press-box from the hopper in order that a maximum quantity of material will be added to the bale by each forward movement of the plunger. For this reason the length of the feeder from its axis to the extreme edge of the extension 17 is sufficient to close the feed-throat 6, and thus cause the entire quantity of material in the hopper to be forced with certainty into the press-box as the feeder is swung down through the throat.

As I have heretofore stated, it is desirable to give the operator as much time as possible in which to properly fill the hopper. It is therefore necessary to provide mechanism for quickly operating the feeder in order that its period of rest in the elevated or inoperative position may be of considerable duration. The mechanism for effecting the quick movement of the feeder is an important feature of the present invention, and it includes what may be termed a "feed-cam" 19, positively connected to the feeder and arranged to be moved from one position to another by the pitman 4 during a small fraction of its stroke. The cam 19 is bifurcated to define a pair of arms 20 and 21, separated by a sufficient interval for the reception of what may be termed a "feed-roller" 22, mounted at the under side of the pitman 4 (see Figs. 4 and 5) and arranged to swing the cam and thereby operate the feeder through the intermediate mechanism. The mounting of the cam 19 includes a bracket 23, bolted or otherwise secured to the reach 2 and extending laterally therefrom. At the outer end of the bracket is located a stub-shaft 24 in the form of a bolt constituting a journal for the end of the cam opposite the arms thereof and provided with a nut 25, bearing upon one end of a spring 26, presenting sufficient frictional resistance to the movement of the cam to yieldingly retain the latter in any position to which it is moved. To the under side of the arm 21 of the cam 19 is pivotally connected the front end of a link or connecting-rod 27, preferably a length of bar metal, twisted at an intermediate point and having pivotal connection at its rear end with the short arm of a bell-crank lever 28, fulcrumed at one side of the press-box and having its long arm connected by means of a link 29 with a comparatively short crank-arm 30, extending laterally from one end of the sleeve 9. When the cam is swung back to the position indicated in full lines in Fig. 4, the bell-crank lever 28 will be oscillated and will in turn oscillate the feeder in a vertical direction to cause the descent of the latter into the hopper and through the feed-throat thereof to the position indicated in Fig. 2, while the movement of the cam to the reverse position (shown in dotted lines in Fig. 4) will effect similar movement of the feeder in the opposite direction to restore it to the position shown in Fig. 1. It will be noted that the arrangement of the links, the bell-crank lever 28, and the crank-arm 30 constitutes a multiplying connection between the cam and the feeder in order that extended and rapid movement of the feeder will be effected by a comparatively slight movement of the cam at comparatively low speed. When the plunger is in its completely-retracted position, the cam will be in the position indicated in full lines in Fig. 4 and the feeder will be completely depressed, as indicated in Fig. 2. As the plunger is advanced by the movement of the pitman in the direction of the arrow in Fig. 4 the roller 22, carried by the pitman, will swing the feed-cam 19 to the dotted position in Fig. 4, thus elevating the feeder. By reason of the multiplying connection between the cam and feeder this complete retraction of the latter will be effected by the initial movement of the pitman, which having moved the cam will continue to advance the plunger for the purpose of compressing the charge of hay or other material previously fed into the press-box by the feeder. As the feeder will be in the elevated position during the larger part of the advance movement of the plunger, the operator may be engaged in refilling the hopper while the preceding charge is being compressed and during the larger portion of the return stroke of the plunger, since it is evident that the feeder will not again move down until the roller 22 again contacts with the cam to retract it, and this will obviously not be effected until the plunger approaches the end of its retractile movement. In other words, the feeder is elevated during the initial movement of the pitman in one direction and is retained in this upright position during the major portion of the advance movement of the plunger and during a like portion of its return movement and is again brought down to feed a charge of hay into the press-box during the final portion of the return movement of the plunger.

In conjunction with my feeder I employ a flexible apron 31, designed to close the feed-throat in rear of the plunger to prevent the hay from being packed down behind the plunger when the latter is moving forward and the hopper is being filled. This apron is composed of hingedly-connected sections 32 and 33, the former being secured at its rear end to the top of the plunger and the other having connection with a pair of metal straps 34, mounted on a rod 35, carried by brackets 36, secured to the hopper. As the plunger moves forward the straps 34 yield to permit the apron to be drawn taut in a horizontal position below the feed-throat, as shown in Fig. 1. When the plunger is retracted, these straps restore the apron to its normal position, as shown in Fig. 2. It will be understood that when the feeder is retracted the edges of the feed-plate 16 abut against the flanges 7 of the hopper, which latter are assisted in limiting the movement of the feeder by a yoke 37, secured to the hopper and designed to receive the impact of the feeder-arms 13. The press is also equipped with the usual appurtenant devices—such, for instance, as the side checks 38 and the top check 39.

Briefly, the operation of the device is as follows: Assuming the parts to be in the positions indicated in Figs. 2 and 4 of the drawings, power mechanism (not illustrated) will reciprocate the pitman 4 to advance the plunger. During the initial movement of the pitman the cam will be swung to elevate the feeder, and the feed-roller 22 will then move out of engagement with the cam as the advance of the plunger is continued to compress the charge of material. As soon as the feeder is elevated the operator will begin to refill the hopper and the material will be prevented by the apron from dropping behind the plunger. The refilling of the hopper will continue during the compression of a charge of material and also during the larger part of the retractile movement of the plunger. Just before the plunger reaches the limit of its return stroke the feed-roller will again engage the cam to throw it back to its normal position, and thereby depress the feeder to force a new charge of cotton out of the hopper and into the press-box for a repetition of the operation.

It is thought that from the foregoing the construction, operation, and advantages of my self-feeder will be clearly apparent; but while the illustrated embodiment of the invention is believed at this time to be preferable I wish to be distinctly understood as reserving to myself the right to effect such changes, modifications, and variations of the illustrated structure as may be fairly embraced within the scope of the protection prayed.

What I claim is—

1. The combination with a baling-press including a press-box, plunger and pitman, of a feeder, a feeder-actuating cam operatively related to the pitman for actuation thereby, and a multiplying-lever in the line of connection between the cam and the feeder.

2. The combination with a baling-press including a press-box, a hopper, a plunger and a pitman for operating the plunger, of an oscillatory feeder normally constituting one end wall of the hopper and arranged to move down into the press-box, a feeder-actuating cam disposed for actuation during the initial movement of the pitman in one direction and during its final movement in the opposite direction, and a multiplying-lever included in the line of connection between the feed-cam and the feeder.

3. The combination with a baling-press including a press-box, an open-ended hopper, a plunger and a pitman for operating the plunger, of an oscillatory feeder normally closing the end of the hopper and arranged to move down into the press-box, a feeder-actuating cam operatively related to the pitman to be operated during a portion of the movement thereof, a crank-arm connected to the feeder, a multiplying-lever, and links connecting the lever with the feed-cam and crank-arm, respectively.

4. The combination with a baling-press including a press-box, an open-ended hopper, a plunger, a pitman for operating the plunger and a reach, of an oscillatory feeder normally closing the end of the hopper and arranged to move down into the press-box, a feeder-actuating cam supported by the reach, a roller carried by the pitman and engaging the cam, and connecting devices between the cam and feeder.

5. The combination with a baling-press including a press-box, an open-ended hopper, a plunger, a pitman for operating the plunger and a reach, of a feeder-actuating cam supported by the reach, a roller carried by the pitman for operating the cam, a feeder normally closing the end of the hopper and arranged to move down into the press-box, and a multiplying-lever located in the line of connection between the cam and feeder.

6. The combination with a baling-press including a press-box, an open-ended hopper, a plunger, a pitman for operating the plunger and a reach, of a bracket carried by the reach, a swinging feeder-actuating cam mounted on the bracket, a roller carried by the pitman and engaging the cam, an oscillatory feeder normally closing the end of the hopper and arranged to move down into the press-box, a bell-crank multiplying-lever located at one side of the press-box, and connections between the lever and the cam and feeder, respectively.

7. The combination with a baling-press including a press-box, an open-ended hopper, a plunger, a pitman and a reach, of a bracket extending laterally from the reach, a bifurcated feeder-actuating cam mounted to swing on said bracket, a roller carried by the pitman and engaging the cam, an oscillatory feeder normally closing the end of the hopper, a crank-arm connected to the feeder, a bell-crank lever mounted at one side of the press-box, and links connecting said lever with the cam and crank-arm, respectively.

8. The combination with a baling-press and its hopper, of an oscillatory feeder movable into the press-box and comprising a feed-plate normally constituting an end wall of the hopper and provided at its free end with an angular extension, extending across the end of the plate to close the space between the plate and the adjacent edge of the feed-opening as the feeder moves down, and means for operating the feeder.

9. The combination with a baling-press and its hopper, of a shaft mounted at the lower front corner of the hopper, a sleeve mounted on said shaft, feed-arms extending from the sleeve, a feed-plate secured to said arms and normally constituting an end wall of the hopper, and means for operating said arms to cause the feed-plate to sweep downwardly through the hopper and into the press-box in advance of the plunger.

10. In a baling-press, the combination with a press-box and hopper, of a feeder normally constituting one end wall of the hopper and comprising feed-arms, a feed-plate secured thereto, and a plate extension bent back abruptly from the plate and having its edge curved outwardly to engage and carry into the press-box such material as escapes the plate.

11. In a baling-press, the combination with a press-box and hopper, of a feeder normally constituting one end wall of the hopper, said feeder comprising feed-arms, a plate secured to the arms and curved to form a beak, and a plate extension extending from the beak in a plane substantially at right angles to the plate, the edge of the plate extension opposite the beak being outwardly curved.

12. In a baling-press, the combination with a press-box and hopper, said hopper being open-ended and provided with stop-flanges extending inwardly along the front edges of its side walls, of a feeder comprising swinging feeder-arms and a feed-plate secured to the arms and extending between the flanges of the hopper to close the end of the latter and retained in its normal position by the flanges, and means for operating the feeder.

13. The combination with a baling-press including a press-box, a hopper, a plunger and a pitman for operating the plunger, of an oscillatory feeder normally constituting one end wall of the hopper and arranged to move down into the press-box, a feeder-actuating cam disposed for actuation during the initial movement of the pitman in one direction and during its final movement in the opposite direction, and means for connecting the feeder-actuating cam with the feeder.

14. The combination with a baling-press including a press-box, plunger and hopper, of an oscillatory feeder comprising a feed-plate normally constituting one end wall of the hopper, and operating mechanism for causing the feeder to move down through the hopper and into the press-box in advance of the plunger.

15. The combination with a baling-press including a press-box, plunger and hopper, of an oscillatory feeder mounted to swing from an axis at the lower front corner of the hopper, and comprising a feed-plate which normally constitutes the front end wall of the hopper, and operating mechanism connected with the feeder to oscillate the same and thereby cause the feed-plate to move down through the hopper and into the press-box in advance of the plunger.

16. The combination with a baling-press including a press-box, a hopper, a plunger and a pitman for operating the plunger, of an oscillatory feeder normally constituting one end wall of the hopper and arranged to move down into the press-box, a feeder-actuating device disposed for actuation during the initial movement of the pitman in one direction, and during its final movement in the opposite direction, and means for connecting the feeder-actuating device with the feeder.

In testimony that I claim the foregoing as my own I have hereto affixed my signature in the presence of two witnesses.

WILLIAM RICHARD COLMAN.

Witnesses:
   E. G. MOREHEAD,
   W. H. HOELSCHER.